United States Patent
Froese et al.

(10) Patent No.: US 11,780,494 B2
(45) Date of Patent: Oct. 10, 2023

(54) CONTROL APPARATUS FOR HYDRAULICALLY STEERED WHEELS OF A TRAILING VEHICLE OPERABLE IN LOCKED AND SELF STEERING CONFIGURATIONS

(71) Applicant: Elmer's Welding & Manufacturing Ltd., Altona (CA)

(72) Inventors: Matthew P. Froese, Altona (CA); Rheal M. Boileau, Altona (CA); Owen R. Cail, Altona (CA)

(73) Assignee: Elmer's Welding & Manufacturing Ltd., Manitoba (CA)

( * ) Notice: Subject to any disclaimer, the term of this patent is extended or adjusted under 35 U.S.C. 154(b) by 603 days.

(21) Appl. No.: 17/028,071

(22) Filed: Sep. 22, 2020

(65) Prior Publication Data
US 2021/0403080 A1 Dec. 30, 2021

(51) Int. Cl.
| | |
|---|---|
| *B62D 5/06* | (2006.01) |
| *F15B 15/20* | (2006.01) |
| *B62D 5/09* | (2006.01) |
| *B62D 13/04* | (2006.01) |
| *B62D 13/06* | (2006.01) |
| *B62D 13/00* | (2006.01) |

(52) U.S. Cl.
CPC .............. *B62D 5/061* (2013.01); *B62D 5/09* (2013.01); *B62D 13/04* (2013.01); *B62D 13/06* (2013.01); *F15B 15/20* (2013.01); *B62D 13/005* (2013.01)

(58) Field of Classification Search
CPC ........ B62D 5/061; B62D 5/09; B62D 13/005; B62D 13/04; B62D 13/06
See application file for complete search history.

(56) References Cited

U.S. PATENT DOCUMENTS

| | | | | |
|---|---|---|---|---|
| 3,212,793 | A | * | 10/1965 | Pietroroia .............. B62D 13/04 280/7 |
| 8,033,376 | B2 | * | 10/2011 | Toews .................. B62D 13/005 198/300 |
| 2009/0032273 | A1 | * | 2/2009 | Hahn ................... B62D 13/005 172/2 |

* cited by examiner

*Primary Examiner* — Kevin Hurley
*Assistant Examiner* — Hosam Shabara
(74) *Attorney, Agent, or Firm* — Ryan W. Dupuis; Kyle R. Satterthwaite; Ade & Company Inc.

(57) ABSTRACT

A control apparatus controls the hydraulic connection between self steering wheels on a trailing vehicle, for example a grain cart, and the hydraulic system of a utility vehicle, for example a tractor, towing the trailing vehicle. An auxiliary circuit on the trailing vehicle forms a continuous loop receiving in series one or more wheel actuators associated with the self steering wheels. A valve arrangement is operable in a locked state or unlocked state in which the continuous loop is isolated from the tractor to prevent or allow a flow of fluid in the continuous loop regardless of the state of the tractor hydraulics. In a manual state, the flow in the loop is dependent upon the tractor hydraulics. In an automatic mode, a controller automatically operates the valve arrangement between the locked and unlocked states dependent upon one or more sensed operating conditions of the trailing vehicle.

20 Claims, 3 Drawing Sheets

| Steering State | SV1 State | SV2 State | SV3 State |
|---|---|---|---|
| Locked | Closed | Closed | Closed |
| Unlocked | Closed | Closed | Open |
| Tractor Controlled | Open | Open | Closed |

CONTROL APPARATUS FOR HYDRAULICALLY STEERED WHEELS OF A TRAILING VEHICLE OPERABLE IN LOCKED AND SELF STEERING CONFIGURATIONS

This application claims foreign priority benefits from Canadian Patent Application 3,084,783, filed Jun. 25, 2020.

FIELD OF THE INVENTION

The present invention relates to a control apparatus for controlling a state of hydraulically linked self steering wheels of a trailing or towed vehicle, for example a grain cart, such that the self steering wheels can be unlocked for freely self steering, locked in a straight configuration, or in some instances controllably steered by an accessory hydraulic circuit of the towing vehicle such as an agricultural tractor to which the trailing vehicle is connected in a towing relationship.

BACKGROUND

Grain carts with multiple steerable axles are preferable to those with multiple non-steerable axles as they reduce tire wear, lower stress on structural components on the cart, and reduce damage to soil conditions when pulling the cart through a turn. Grain carts with multiple steerable axles typically use a self-steering design, in which the ground forces exerted on the tire during a turn induces a steering angle in the desired direction. Similarly, towing the grain cart in a straight line returns the tires to a steering angle of zero. One drawback to this design is its response when the grain cart is moved in a reverse direction. In this situation, the forces exerted by the ground on the tire induce a steering angle which is not desirable. For this reason, self-steering axles are fitted with an actuator of some type, typically a hydraulic cylinder, which can be locked in place to prevent steering during reversing and in other situations where a steering angle is not desired. The actuator is otherwise unlocked, allowing the tires to assume steering angles freely.

The locking and unlocking of steering on current grain carts is done manually by the operator via a switch or button in the tractor cab. It is important that this be performed correctly; having the steering in the unlocked state when reversing can result in the cart moving unpredictable, or even cause damage to the cart. Having the steering in the locked state when making a turn in the forward direction can cause increased stress to structural components of the cart, increase tire wear, and negatively affect soil conditions.

United States Patent Application Publication No. 2009/0032273, filed on Jun. 19, 2008, by Deere & Company, discloses an implement/vehicle steering control system and method. The control system controls steering of an implement which is coupled to an agricultural utility vehicle. The control system includes a control unit, a sensor, a hydraulic system on the utility vehicle, an electronically actuatable hydraulic valve, a hydraulic actuator on the implement and a steerable wheel on the implement. A status variable of the utility vehicle or of the implement can be detected with the sensor and transmitted to the control unit. A current operating state of the utility vehicle and/or of the implement is determined by the control unit. The hydraulic valve is connected to the hydraulic system and to the actuator. The hydraulic valve can be actuated as a function of the current operating state of the utility vehicle and/or of the implement in order to block the steering of the wheel with the actuator; however, the steering of the wheels is always dependent upon the condition of the hydraulic circuit of the utility vehicle to which the control system is connected. Accordingly, the implement is steered exclusively by the actuator and is not capable of a self steering mode or any change in condition of the steering independent of the utility vehicle.

SUMMARY OF THE INVENTION

According to one aspect of the invention there is provided a control apparatus for use in a trailing vehicle arranged to be connected in towed relation to a utility vehicle, the utility vehicle including a hydraulic system having at least one accessory circuit comprised of two connecting lines and a utility switch on the utility vehicle operatively connected between the first and second connecting lines in which the utility switch is operable in at least one first active state in which the hydraulic system actively pumps fluid into a first connecting line of the two connecting lines and receives fluid through a second connecting line of the two connecting lines and in at least one second state different from the first active state, and the trailing vehicle including at least two self steering wheels that are arranged to self steer in response to rolling ground contact, the control apparatus comprising:

at least one wheel actuator arranged to be operatively connected to the self steering wheels of the trailing vehicle, the wheel actuator comprising a hydraulic actuator have a pair of opposing fluid ports;

an auxiliary circuit arranged to be supported on the trailing vehicle;

the auxiliary circuit forming a continuous loop receiving said at least one wheel actuator connected in series with the continuous loop;

two hydraulic connectors arranged to be supported on the trailing vehicle and arranged to be connected to the two connecting lines of the accessory circuit of the towing vehicle;

a valve arrangement operatively connecting the two hydraulic connectors to the continuous loop of the auxiliary circuit;

the valve arrangement being operable in a locked state in which the continuous loop is isolated from the two hydraulic connectors and in which the continuous loop is interrupted to prevent a flow of fluid in the continuous loop regardless of the state of the accessory circuit of the utility vehicle; and the valve arrangement being operable in an unlocked state in which the continuous loop is isolated from the two hydraulic connectors and in which the continuous loop is uninterrupted to allow the flow of fluid in the continuous loop regardless of the state of the accessory circuit of the utility vehicle.

The valve arrangement is a system which can be readily added to hydraulically actuated steering systems of various implements. The system provides the ability to isolate the towed vehicle's steering function from the valve position on the accessory hydraulic circuit of the utility vehicle in numerous different steering modes.

In some embodiments, the present invention may further include a controller that can monitor the speed and direction of travel of the trailing vehicle, for example a grain cart, and can automatically lock or unlock the steering system based on these inputs, without the input of the operator. Specifically, the controller of the system can use speed and direction data to automatically select locked or unlocked states when in an automatic mode. The automatic selection of locked/unlocked states in an automatic mode can be accomplished without operator input due to the isolation of the cart's steering system from the tractor's hydraulic valve position so as to be a truly automatic system. Otherwise, if the tractor's hydraulics affect the system's ability to lock or float, then some level of operator input is required and the system is not truly automatic.

According to a second aspect of the present invention there is provided a trailing vehicle arranged to be connected in towed relation to a utility vehicle, the utility vehicle including a hydraulic system having at least one accessory circuit comprised of two connecting lines and a utility switch on the utility vehicle operatively connected between the first and second connecting lines in which the utility switch is operable in at least one first active state in which the hydraulic system actively pumps fluid into a first connecting line of the two connecting lines and receives fluid through a second connecting line of the two connecting lines and in at least one second state different from the first active state, the trailing vehicle comprising:

- at least two self steering wheels that are arranged to self steer in response to rolling ground contact;
- at least one wheel actuator operatively connected to the self steering wheels, the at least one wheel actuator comprising a hydraulic actuator have a pair of opposing fluid ports;
- an auxiliary circuit supported on the trailing vehicle, the auxiliary circuit forming a continuous loop receiving said at least one wheel actuator connected in series with the continuous loop;
- two hydraulic connectors arranged to be connected to the two connecting lines of the accessory circuit of the towing vehicle; and
- a valve arrangement operatively connecting the two hydraulic connectors to the continuous loop of the auxiliary circuit;
- the valve arrangement being operable in a locked state in which the continuous loop is isolated from the two hydraulic connectors and in which the continuous loop is interrupted to prevent a flow of fluid in the continuous loop regardless of the state of the accessory circuit of the utility vehicle; and
- the valve arrangement being operable in an unlocked state in which the continuous loop is isolated from the two hydraulic connectors and in which the continuous loop is uninterrupted to allow the flow of fluid in the continuous loop regardless of the state of the accessory circuit of the utility vehicle.

Preferably the valve arrangement includes a control valve connected in series with the continuous loop of the auxiliary circuit, the control valve being operable between a closed position interrupting the continuous loop in the locked state of the valve arrangement and an open position allowing fluid flow in the continuous loop in the unlocked state of the valve arrangement.

The valve arrangement may also be operable in a controlled state in which auxiliary circuit is fluidly connected to the two hydraulic connectors such that the flow of fluid in the auxiliary circuit of the trailing vehicle is dependent upon the state of the accessory circuit of the utility vehicle. In this instance, the valve arrangement may further include two isolation valves, in which each isolation valve is arranged to connect one of the connecting lines of the accessory circuit of the utility vehicle to the continuous loop of the auxiliary circuit on the trailing vehicle, and in which the isolation valves are operable between (i) a closed position in which the auxiliary circuit is isolated from the accessory circuit in the locked state and in the unlocked state of the valve arrangement and (ii) an open position in which the auxiliary circuit of the trailing vehicle communicates with the accessory circuit of the utility vehicle in the controlled state of the valve arrangement. When the valve arrangement further includes a control valve connected in series with the continuous loop of the auxiliary circuit so as to be operable between a closed position interrupting the continuous loop in the locked state of the valve arrangement and an open position allowing fluid flow in the continuous loop in the unlocked state of the valve arrangement, the control valve is preferably situated in the continuous loop directly between junctions of the isolation valves with the continuous loop.

The control apparatus may further comprise one or more condition sensors arranged to be supported on the trailing vehicle so as to be arranged to sense one or more prescribed operating conditions of the trailing vehicle. In this instance, a controller may be operatively connected to the valve arrangement and operable in an automatic mode in which the controller is arranged to change the valve arrangement from the unlocked state to the locked state responsive to the one or more prescribed operating conditions sensed by the one or more condition sensors meeting one or more locking criterium stored on the controller.

The one or more condition sensors may include a speed sensor arranged to sense an operating speed of the trailing vehicle in which the one or more locking criterium includes a speed limit, whereby the controller is arranged to change the valve arrangement from the unlocked state to the locked state responsive to the operating speed sensed by the speed sensor exceeding the speed limit stored on the controller.

The one or more condition sensors may also include a directional sensor arranged to sense an operating direction of the trailing vehicle in which the one or more locking criterium includes a reverse direction of operation of the trailing vehicle, whereby the controller is arranged to change the valve arrangement from the unlocked state to the locked state responsive to the operating direction sensed by the directional sensor corresponding to the reverse direction.

The valve arrangement may be operable in a controlled state in which auxiliary circuit is fluidly connected to the two hydraulic connectors such that the flow of fluid in the auxiliary circuit of the trailing vehicle is dependent upon the state of the accessory circuit of the utility vehicle. In this instance, the controller may include a controlled mode of operation in which the valve arrangement remains in the controlled state regardless of an operating condition of the utility vehicle.

The controller may also include a locked mode of operation in which the valve arrangement remains in the locked state regardless of an operating condition of the utility vehicle.

The controller may be operatively connected to an operator interface arranged to be supported in an operator cab of the utility vehicle and arranged to switch the mode of controller between the automatic mode, the controller mode, and the locked mode in response to operator input.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures there is illustrated a steering control apparatus 10 for use with a trailing vehicle, for example a grain cart 12, that has one or more self-steering wheels 14 and that is arranged to be connected in towed relation to a utility vehicle, for example a tractor 16, for movement across ground together in a forward working direction.

Figure 1:
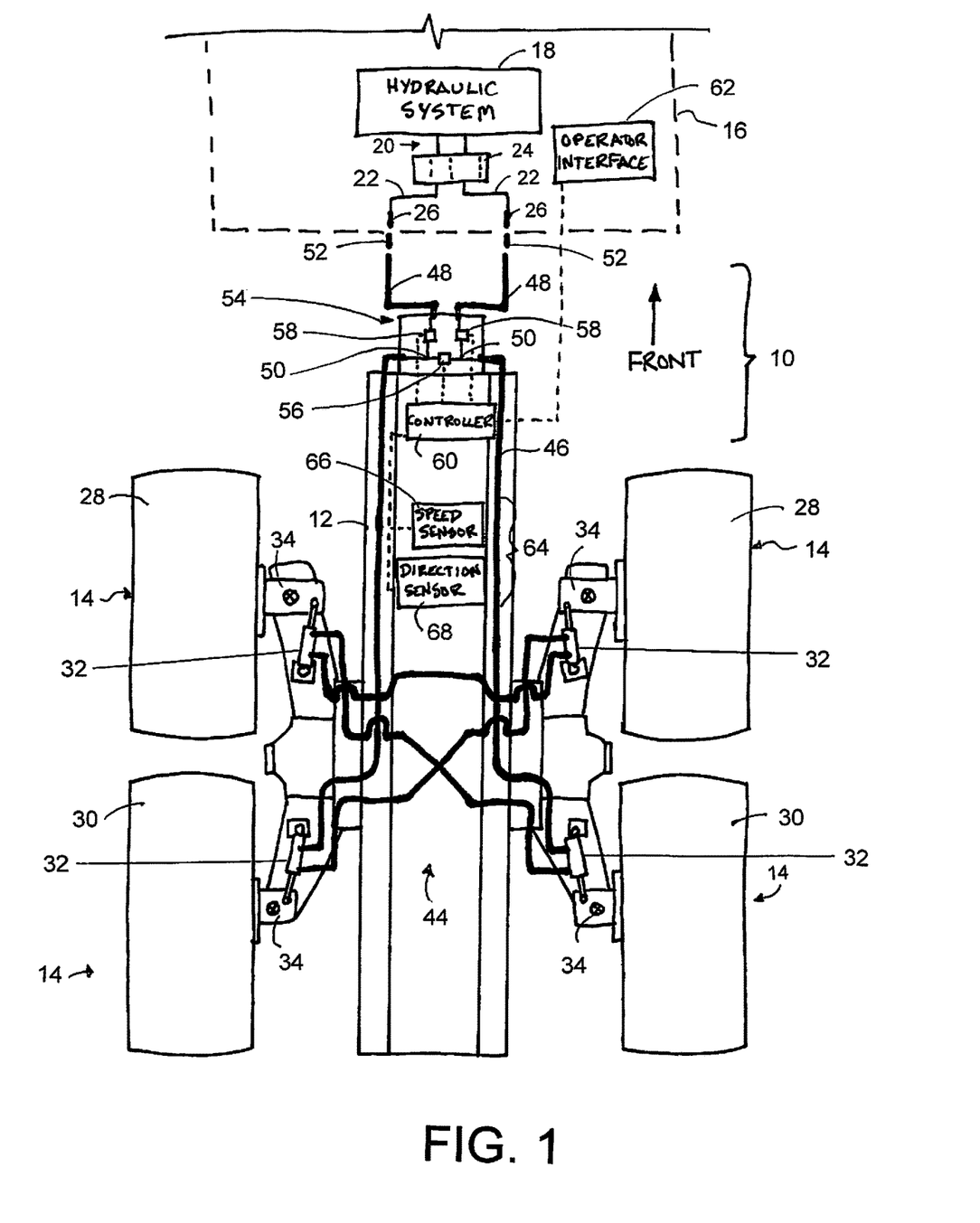
FIG. 1 is a schematic representation of a grain cart connected in towing relationship to an agricultural tractor in which the control apparatus according to the present invention is operatively connected to the hydraulically steerable wheels of the grain cart in a locked state of the valve arrangement.

The tractor 16 includes a frame supported on wheels and a motor for driving rotation of the wheels to displace the vehicle in a forward working direction under normal operation in the usual manner of an agricultural tractor. The frame further includes a hitch connector at the rear end of the towing vehicle for connection of the trailing vehicle thereto in a towing relationship.

Figure 2:
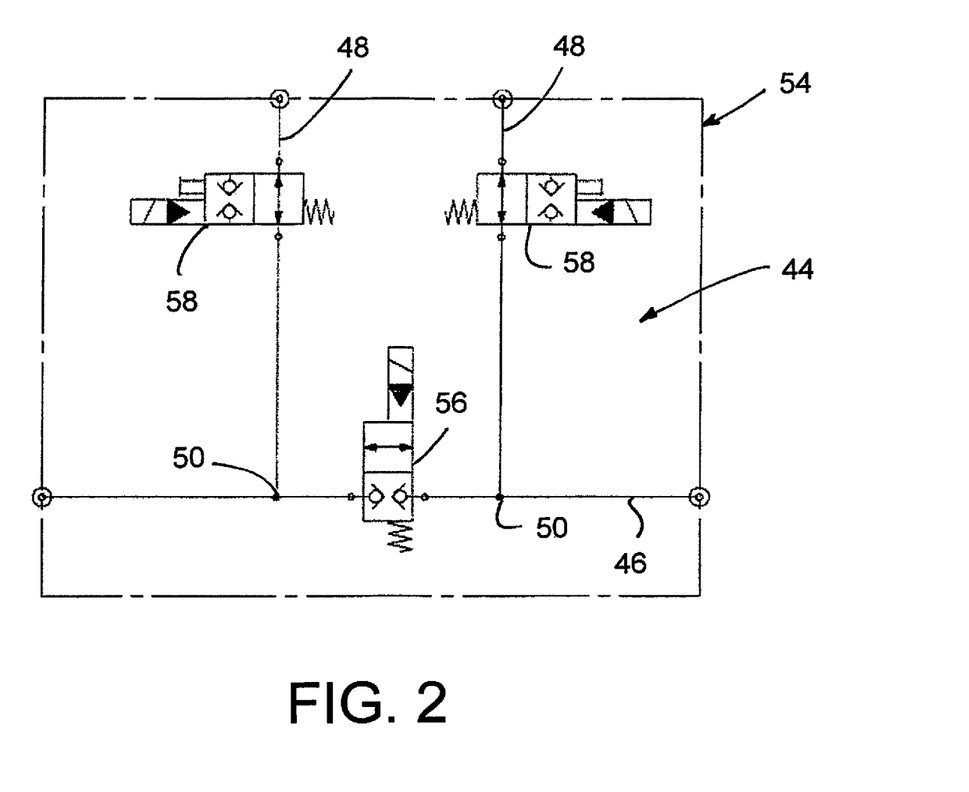
FIG. 2 is a schematic representation of the control apparatus used on the grain cart according to FIG. 1.

A hydraulic system 18 is supported on the tractor including a pump for supplying a flow of hydraulic fluid under pressure from a reservoir which receives a return flow of the hydraulic fluid. The hydraulic flow of fluid can be directed through a plurality of different circuits under control of respective hydraulic valves of the system 18. The plurality of hydraulic circuits includes at least one accessory circuit 20 comprised of two connecting lines 22 arranged to be selectively connected to supply and return lines of the hydraulic system 18 in various configurations by a utility switch 24. The free ends of the two connecting lines 22 support respective hydraulic connectors 26 thereon which served to connect the connecting lines 22 to the hydraulic system of an accessory device such as the grain cart 12 described herein.

The utility switch 24 of the accessory circuit 20 of the tractor can be positioned in a first active state in which hydraulic flow is directed into a first connecting line of the two connecting lines 22 and returned in a second connecting line of the two connecting lines, and in a second active state in which the hydraulic flow is reversed so as to direct the hydraulic flow into the second connecting line and return the hydraulic flow in the first connecting line. The utility switch 24 can also be positioned in a locked state in which flow in both of the connecting lines 22 is blocked. The utility switch 24 can be further positioned in a neutral state in which the two connecting lines 22 allow free flow of hydraulic fluid therethrough by connecting the two connecting lines 22 to one another or by openly connecting the two connecting lines to the return reservoir of the hydraulic system 18.

The grain cart 12 also includes a frame supported for rolling movement along the ground on the set of wheels 14 as described in further detail below. A hitch member (not shown) is supported at a forward end of the frame of the grain cart for releasable connection to the hitch connector at the rear of the towing vehicle in a conventional manner such that the grain cart 12 follows the tractor in the forward working direction across the grounds.

The set of wheels of the grain cart includes two front wheels 28 pivotally coupled to the frame for movement about respective upright steering axes relative to the frame in a self steering manner. The two front wheels are situated at laterally opposing sides of the frame in proximity to a front end of the frame. In the illustrated embodiment the front wheels are hydraulically linked together so to be arranged to be steered together in the same direction relative to the frame.

The set of wheels of the grain cart also includes two rear wheels 30 pivotally coupled to the frame for movement about respective upright steering axes relative to the frame in a self steering manner. The two rear wheels are situated at laterally opposing sides of the frame in proximity to a rear end of the frame. In the illustrated embodiment, the rear wheels are hydraulically linked together so as to be arranged to be steered together in the same lateral direction relative to the frame. Furthermore, the rear wheels are hydraulically linked to the front wheels so as to be arranged to be steered together with the front wheels but in an opposing lateral direction relative to the front wheels.

In further embodiments, the wheels of the trailing vehicle 12 may comprise a single pair of wheels which are self steering and which are operatively connected together to be steered together in the same lateral direction relative to the frame. In yet further arrangements, one of the front pair of wheels 28 or the rear pair of wheels 30 may be a pair of fixed wheels which remain locked in a forward rolling orientation while the other pair of wheels are self steering and are operatively connected together to be steered together in the same lateral direction relative to the frame.

The control apparatus 10 may be integrally manufactured as part of the grain cart 12 or may comprise an add-on module which is retrofitted onto an existing grain cart having self steering wheels which are otherwise selectively manually locked in a forward rolling orientation when desired.

The control apparatus 10 in all instances includes one or more wheel actuators 32 which are operatively connected to one or more of the self steering wheels of the grain cart 12.

In the illustrated embodiment, one of the wheel actuators 32 is associated with each of the individual wheels 28 and 30 such that the hydraulic connection between the wheel actuators 32 forms the operative connection between the self steering wheels which causes the wheels to be steered together as described above.

In further embodiments, two of the wheels of the cart may be mechanically linked by a coupling linkage with a single wheel actuator 32 being (i) operatively connected between the coupling linkage in the frame or (ii) operatively connected between one of the wheels of the cart and the frame. In yet further embodiments, all of the wheels of the cart may be mechanically linked by a coupling linkage with a single wheel actuator being (i) operatively connected between the coupling linkage in the frame or (ii) operatively connected between one of the wheels of the cart and the frame. Each self steering wheel includes an axle body 34 supporting a respective wheel thereon for rotation about a rolling axis of the wheel. The axle body 34 is in turn pivotally coupled to the frame of the grain cart 12 for relative pivotal movement of the axle body and the wheel supported thereon about the respective upright steering axis. In the preferred embodiment, each wheel actuator 32 is pivotally connected at one end onto the frame of the grain cart and is pivotally connected at the opposing end onto the axle body 34 of the respective wheel such that extension and retraction of an overall length of the actuator causes pivoting of the associated wheel about the upright steering axis thereof relative to the frame.

Each wheel actuator 32 is a hydraulic linear actuator including a cylinder portion 36 having an elongate chamber therein and which receives a piston portion 38 linearly slidable within the chamber of the cylinder portion 36 between opposing ends thereof. A pair of hydraulic ports 40 communicate with the chamber within the cylinder portion 36 at opposing ends thereof so as to receive the piston portion 38 between the two ports 40. A rod 42 is connected to the piston portion 38 to extend linearly outward from the cylinder portion. The overall length of the actuator between one end of the cylinder portion 36 and the opposing end of the rod 42 varies as the piston portion 38 is slidably displaced along the chamber of the cylinder portion while hydraulic fluid enters and exits opposing ends of the chamber through the opposing ports 40 respectively.

The control apparatus 10 further includes an auxiliary hydraulic circuit 44 supported on the grain cart to define a continuous loop 46 receiving each wheel actuator 32 connected in series therewith. More particularly, a hydraulic connecting line of the loop 46 is connected from each port 40 of each wheel actuator to the corresponding port 40 of an adjacent wheel actuator 32 such that each wheel actuator forms part of the continuous loop, whereby fluid discharged from the end of one of the actuators is directed into one end of an adjacent actuator causing a discharge of fluid from the other end of that adjacent actuator in a sequential manner between all of the wheel actuators.

In the illustrated embodiment, the wheel actuators 32 are connected in alternating orientation relative to the next adjacent wheel actuator such that (i) the port 40 at the outer end of the cylinder portion of each wheel actuator communicates with the port 40 at the outer end of the cylinder portion of the next adjacent wheel actuator, and (ii) the port 40 at the inner end of the cylinder portion of each wheel actuator communicates with the port 40 at the inner end of the cylinder portion of the next adjacent wheel actuator.

Figure 4:
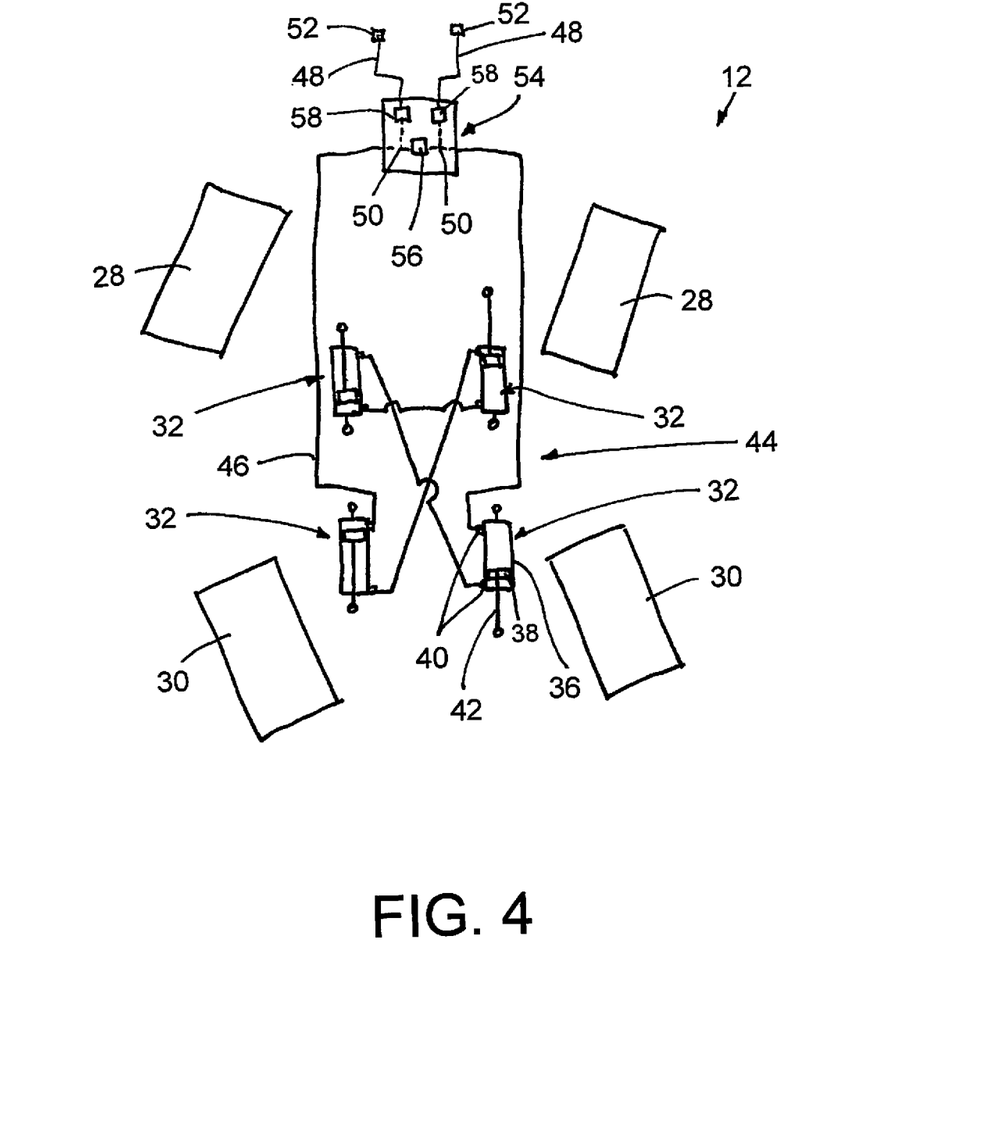
FIG. 4 is a schematic representation of the grain cart according to FIG. 1 in which the wheels of the grain cart are steered in a first direction in an unlocked state of the valve arrangement.

Regardless of the selected orientation of the wheel actuators relative to the wheels, the auxiliary hydraulic circuit 44 is arranged such that a fluid flow in a single direction about the entirety of the continuous loop 46 causes all of the wheels to be commonly steered such that (i) the two front wheels are steered in the first lateral direction while the two rear wheels are steered in the opposing second lateral direction simultaneously with one another to steer the grain cart in the first lateral direction, (ii) the front wheels are steered in the second lateral direction while the two rear wheels are steered in the opposing first lateral direction simultaneously with one another to steer the grain cart in the second lateral direction, or (iii) all wheels are commonly oriented for rolling movement in the forward working direction.

The auxiliary hydraulic circuit 44 further includes two hydraulic coupling lines 48 which are each connected to the continuous loop 46 by a respective tee junction 50. Each of the coupling lines 48 includes a hydraulic connector 52 at the outer free end thereof. The hydraulic connectors 52 of the auxiliary hydraulic circuit 44 on the grain cart are arranged to form releasable connections to the two hydraulic connectors 26 of the connecting lines 22 of the hydraulic system of the tractor to allow fluid connection of hydraulic fluid between the coupling lines 48 on the grain cart and the connecting lines 22 on the tractor.

A valve arrangement 54 of the control apparatus 10 is operatively connected to the coupling lines 48 and the continuous loop 46 of the auxiliary hydraulic circuit 44 on the grain cart for controlling hydraulic fluid flow therethrough.

The valve arrangement 54 includes a control valve 56 connected in series with the continuous loop 46 at a location directly between the junctions 50 of the coupling lines 48 with no other components being received in series with the continuous loop between the two junctions. The continuous loop 46 effectively comprises (i) a first portion formed between the two junctions 50 which receives the control valve 56 therein and (ii) a second portion forming a majority of the continuous loop and which includes all of the wheel actuators 32 connected in series therewith.

The valve arrangement 54 further includes two isolation valves 58 which are coupled in series with the pair of coupling lines 48 respectively in proximity to the junctions 50 respectively. The isolation valves 58 are typically operated together between open and closed positions thereof. In the open position of the isolation valves 58, the auxiliary hydraulic circuit 44 on the grain cart openly communicates in fluid connection with the connecting lines 22 of the accessory circuit 20 on the tractor. Alternatively, in the closed position of the isolation valves 58, the auxiliary hydraulic circuit 44 on the grain cart is closed off and isolated from the connecting lines 28 of the accessory circuit 20 on the tractor.

Each of the control valve 56 and the two isolation valves 58 is a solenoid operated valve so that the valve can be opened and closed by energizing and de-energizing the associated solenoid. A controller 60 is provided for energizing in de-energizing the solenoids to control opening and closing of the valves 56 and 58. The controller 60 comprises a programmable controller including a memory storing programming instructions thereon and a processor arranged to execute the programming instructions to perform the various functions described herein.

Figure 3:
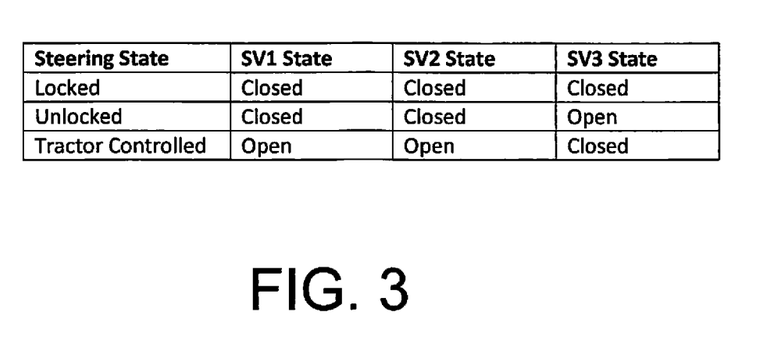
FIG. 3 is a chart representing the different states of the valve arrangement of the control apparatus.

The controller 60 is arranged to control the valves of the valve arrangement 54 in various combinations of open and closed valves to determine a plurality of different steering states of the grain cart.

In a locked state, the controller closes the control valve 56 and both isolation valves 58 so that the continuous loop 46 is isolated from the hydraulics of the tractor by the isolation valves in a closed loop which is then interrupted by the control valve 56 to prevent fluid flow in the continuous loop and lock each of the wheel actuators 32 in a forward rolling orientation of the associated wheels. The isolation of the continuous loop 46 from the tractor allows the wheels to be locked regardless of the configuration of the hydraulic switch 24 of the accessory circuit of the tractor.

In an unlocked state, the controller closes both of the isolation valves so that the continuous loop 46 is isolated from the hydraulics of the tractor; however, the control valve remains open such that the continuous loop 46 is a closed loop allowing free flow of hydraulic fluid therethrough in either direction. The wheels of the cart can thus freely pivot in a self steering configuration relative to the frame of the grain cart regardless of the configuration of the hydraulic switch 24 of the accessory circuit of the tractor.

In a manual or tractor controlled state, the controller closes the control valve 56 and opens both isolation valves 58. In this manner the continuous loop 46 is interrupted and instead forms part of a larger loop together with the connecting lines 22 of the accessory circuit 20 of the tractor. The utility switch 24 of the accessory circuit on the towing vehicle in this instance controls the fluid flow in the larger loop that includes the auxiliary circuit 44 on the grain cart together with the wheel actuators 32 connected in series with the auxiliary circuit 44. In this instance, positioning the utility switch 24 in the first active state results in fluid flow through the auxiliary hydraulic circuit 44 in a first flow direction to actively steer the grain cart in a first lateral direction. Alternatively, positioning the utility switch 24 in the second active state results in fluid flow through the auxiliary hydraulic circuit 44 in a second flow direction to actively steer the grain cart in a second lateral direction. The utility switch 24 can also be positioned in the locked state which functions to lock the fluid flow in the auxiliary hydraulic circuit 44 to lock the wheels in the forward rolling orientation. In the neutral position of the utility switch 24 of the tractor, fluid flows freely in the auxiliary hydraulic circuit 44 through exchange of fluid with the accessory circuit of the tractor so that the wheels are freely pivoted relative to the frame of the grain cart in a self steering configuration.

The control apparatus 10 further includes an operator interface 62 arranged to be supported within an operator cab of the tractor. The operator interface accepts operator input for selecting an operating mode of the controller 60 according to the programming of the controller. The controller 60 changes modes in response to operator input through the operator interface 62. The various operating modes include a locked mode selectable by the operator using the operator interface 62 in which the controller maintains the valves in the locked state regardless of the operating condition of the tractor. The controller also includes a manual mode in which the controller maintains the valve in the tractor controlled state so that the flow condition in the auxiliary circuit 44 of the grain cart is dependent upon the positioning of the utility switch 24 of the tractor.

The controller 60 further includes an automatic mode in which the controller automatically switches the valve arrangement between the locked state and the unlocked state in response to one or more operating conditions of the grain cart as determined by one or more condition sensors 64 mounted on the grain cart according to the preferred embodiment, or mounted on the tractor in alternative embodiments. The sensed operating conditions of the grain cart are compared by the controller to locking criteria also stored on the controller. When the sensed conditions meet the locking criteria, the controller changes the state of the valve arrangement from the unlocked state to the locked state; however, when the locking criteria is no longer met, the controller changes the state of the valve arrangement from the locked state back to the unlocked state.

In the preferred embodiment, the condition sensors 64 include a speed sensor 66 which senses the speed of movement of the grain cart and the tractor across the ground in the forward working direction by various means described herein below. The sensed speed in the forward working direction is compared to locking criteria stored on the controller which in this instance is a speed limit. When the sensed speed exceeds the speed limit, the controller displaces the valve arrangement into the locked state; however, when the sensed speed falls below the speed limit, the controller displaces the valve arrangement into the unlocked state.

The condition sensors 64 preferably also include a directional sensor 68 which senses an operating direction of the grain cart and the tractor across the ground by various means described herein below. More particularly the directional sensor can distinguish between movement of the grain cart in the forward working direction from movement of the tractor in an opposing rearward direction. The locking criteria in this instance comprises determination that the tractor is moving across the ground in the reverse direction. Accordingly, the controller displaces the valve arrangement into the locked state when it is determined that the tractor is moving in the reverse direction; however, when the tractor is moving in the forward direction, the controller returns the valve arrangement into the unlocked state.

When multiple different operating conditions of the vehicle are being sensed, each with a respective locking criterium stored on the controller in association therewith, the controller will displace the valve arrangement into the locked state if any one of the sensed conditions meets its respective criterium even if not all of the other sensed operating conditions meet their respective criterium.

Under normal operation, the operator selects the automatic mode of operation through the operator interface 62. In this instance, the controller will automatically displace the valve arrangement between the locked and unlocked states according to the sensed operating condition of the tractor. Due to the isolation valves 58, the controller can effectively lock and unlock the self steering function of the wheels of the grain cart regardless of the operating condition of the utility switch 24 of the accessory circuit 20 of the towing vehicle to which the control apparatus is connected such that the automatic mode does not rely on an operator to make an appropriate selection with the utility stitch 24 on the tractor in order to operate effectively.

In one embodiment of the design, the hydraulic manifold contains three electrically activated blocking valves labeled 56, 58, and 58 (as shown in FIG. 2) which are activated by the design's control system 60. The coupling lines 48 are connected to the connecting lines 22 on the tractor, while junctions 50 are plumbed into continuous loop locating the wheel actuators 32 therein. By activating various combinations of blocking valves, the presented embodiment can achieve three different steering states as shown in FIG. 3.

In the "locked" state, the grain cart's wheels are prevented from moving from their current steering angle, regardless of the position of the tractor's hydraulics. In the "unlocked" state, the grain cart's wheels are allowed to steer freely regardless of the position of the tractor's hydraulics. In this state, hydraulic fluid is not exchanged with the tractor; the hydraulic manifold creates an open loop with the steering cylinders separate from the tractor. In the "manual" state, the operator is able to control the grain cart's steering system by placing the tractor's hydraulics in float, flow, or the neutral position.

In one embodiment of the design, the operator is able to select between one of three operating modes: AutoLock, Locked, and Tractor Controlled/Manual. The selection of operating modes is done via an operator interface. This interface can be a tablet or similar device which communicates with the steering system's control system, or a multi-position switch, with each switch position corresponding to a specific operating mode.

In the "Locked" mode, the control system forces the steering system into the "locked" state by activating the corresponding valves in the hydraulic manifold.

In the "Manual" mode, the control system forces the steering system into the "manual" state by activating the corresponding valves in the hydraulic block.

In the "AutoLock" mode, the control system automatically switches between the "locked" state and "unlocked" state based on inputs regarding the grain cart's speed and direction of travel. If the cart is moving in the reverse direction, the control system may place the steering system in the "locked" state. Additionally, if the grain cart is travelling forward above some maximum speed threshold, the control system will place the steering system in the "locked" state. This maximum speed threshold may be pre-programmed into the control system, or configurable by the operator. The control system may place the steering system in the "unlocked" state otherwise.

Speed and direction of travel of the grain cart may be determined using a variety of techniques. These include: (i) a directional proximity sensor which reads indicators which are integrated into or fixed to a wheel, hub, brake rotor, or brake drum; (ii) a combination of multiple proximity sensors which read indicators integrated into or fixed to a wheel, hub, brake rotor, or brake drum; (iii) a GPS signal from a receiver mounted to the grain cart or tractor; (iv) an accelerometer mounted to the grain cart or tractor; and/or (v) a signal communicating the tractor's speed and direction of travel.

In any case, the signal from any of these devices is sent to the control system to determine the appropriate steering state.

The control system may utilize existing controllers on the grain cart, which performs tasks relating to other operations of the cart, or may be dedicated to the steering system. In either case, the control system receives input from the operator interface regarding the desired operating mode, and selects the appropriate steering state based in the information received regarding the grain cart's speed and direction of travel. The control system then activates valves in the hydraulic manifold corresponding to the selected steering state. The control system may provide feedback to the operator regarding the selected operating mode and steering state. This feedback may be presented on the tablet or similar device, or on indicator light or lights corresponding to specific operating modes or steering states.

The design is presented for a grain cart with four steerable wheels. The design can similarly be applied to grain carts with two non-steerable wheels and two steerable wheels, or grain carts with two non-steerable wheels and four steerable wheels.

According to a preferred embodiment, the control apparatus 10 generally comprises a steering system for a multi-axle grain cart application which:
  Contains one or more hydraulic manifolds, the valves in which are activated by a control unit;
  Contains one or more control units, which can be dedicated to the steering system, or also perform other cart functions;
  Is capable of a minimum of three steering states, consisting of at least a locked state, an unlocked state, and a manual state;
  Allows the operator to select between at least two operating modes, two of which being an Auto mode, and a Manual mode o May include a third Locked mode;
  Contains or has access to information from sensor or sensors which communicate implement speed and direction of travel;
  Has an unlocked steering state, which allows two or more of the implement's tires to steer freely, regardless of operation of the tractor's hydraulics;
  Has a locked steering state, which prevents two or more of the implement's tires from steering, regardless of operation of the tractor's hydraulics;
  Has a manual steering state, which allows two of more of the implement's tires to be controlled by the tractor's hydraulic system;
  Has an operator selectable Manual operating mode, which places the steering in the manual state;
  May have an operator selectable Locked operating mode, which places the steering in the locked state; and
  Has an operator selectable Auto operating mode, which places the steering system in either the locked state or unlocked state, based on information received from the sensor or sensors regarding the implement's speed and direction of travel, without further operator input.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A control apparatus for use in a trailing vehicle arranged to be connected in towed relation to a utility vehicle, the utility vehicle including a hydraulic system having at least one accessory circuit comprised of two connecting lines and a utility switch on the utility vehicle operatively connected between the first and second connecting lines in which the utility switch is operable in at least one first active state in which the hydraulic system actively pumps fluid into a first connecting line of the two connecting lines and receives fluid through a second connecting line of the two connecting lines and in at least one second state different from the first active state, and the trailing vehicle including at least two self steering wheels that are arranged to self steer in response to rolling ground contact, the control apparatus comprising:
  at least one wheel actuator arranged to be operatively connected to the self steering wheels of the trailing vehicle, the at least one wheel actuator comprising a hydraulic actuator have a pair of opposing fluid ports;
  an auxiliary circuit arranged to be supported on the trailing vehicle;
  the auxiliary circuit forming a continuous loop receiving said at least one wheel actuator connected in series with the continuous loop;
  two hydraulic connectors arranged to be supported on the trailing vehicle and arranged to be connected to the two connecting lines of the accessory circuit of the towing vehicle;
  a valve arrangement operatively connecting the two hydraulic connectors to the continuous loop of the auxiliary circuit;
  the valve arrangement being operable in a locked state in which the continuous loop is isolated from the two hydraulic connectors and in which the continuous loop is interrupted to prevent a flow of fluid in the continuous loop regardless of the state of the accessory circuit of the utility vehicle; and
  the valve arrangement being operable in an unlocked state in which the continuous loop is isolated from the two hydraulic connectors and in which the continuous loop is uninterrupted to allow the flow of fluid in the continuous loop regardless of the state of the accessory circuit of the utility vehicle.

2. The control apparatus according to claim 1 wherein the valve arrangement includes a control valve connected in series with the continuous loop of the auxiliary circuit, the control valve being operable between a closed position interrupting the continuous loop in the locked state of the valve arrangement and an open position allowing fluid flow in the continuous loop in the unlocked state of the valve arrangement.

3. The control apparatus according to claim 1 further comprising:
  the valve arrangement being operable in a controlled state in which auxiliary circuit is fluidly connected to the two hydraulic connectors such that the flow of fluid in the auxiliary circuit of the trailing vehicle is dependent upon the state of the accessory circuit of the utility vehicle; and the valve arrangement including two isolation valves, each isolation valve being arranged to connect one of the connecting lines of the accessory circuit of the utility vehicle to the continuous loop of the auxiliary circuit on the trailing vehicle, the isolation valves being operable between (i) a closed position in which the auxiliary circuit is isolated from the accessory circuit in the locked state and in the unlocked state of the valve arrangement and (ii) an open position in which the auxiliary circuit of the trailing vehicle communicates with the accessory circuit of the utility vehicle in the controlled state of the valve arrangement.

4. The control apparatus according to claim 3 wherein the valve arrangement includes a control valve connected in series with the continuous loop of the auxiliary circuit, the control valve being operable between a closed position interrupting the continuous loop in the locked state of the valve arrangement and an open position allowing fluid flow in the continuous loop in the unlocked state of the valve arrangement, the control valve being situated in the continuous loop directly between junctions of the isolation valves with the continuous loop.

5. The control apparatus according to claim 1 further comprising one or more condition sensors arranged to sense one or more prescribed operating conditions of the trailing vehicle, and a controller operatively connected to the valve arrangement, the controller being operable in an automatic mode in which the controller is arranged to change the valve arrangement from the unlocked state to the locked state responsive to the one or more prescribed operating conditions sensed by the one or more condition sensors meeting one or more locking criterium stored on the controller.

6. The control apparatus according to claim 5 wherein the one or more condition sensors include a speed sensor arranged to sense an operating speed of the trailing vehicle and wherein the one or more locking criterium includes a speed limit, whereby the controller is arranged to change the valve arrangement from the unlocked state to the locked state responsive to the operating speed sensed by the speed sensor exceeding the speed limit stored on the controller.

7. The control apparatus according to claim 5 wherein the one or more condition sensors include a directional sensor arranged to sense an operating direction of the trailing vehicle and wherein the one or more locking criterium includes a reverse direction of operation of the trailing vehicle, whereby the controller is arranged to change the valve arrangement from the unlocked state to the locked state responsive to the operating direction sensed by the directional sensor corresponding to the reverse direction.

8. The control apparatus according to claim 5 wherein the controller includes a locked mode of operation in which the valve arrangement remains in the locked state regardless of an operating condition of the utility vehicle, the apparatus further comprising an operator interface arranged to be supported in an operator cab of the utility vehicle and arranged to switch the mode of controller between the automatic mode and the locked mode in response to operator input.

9. The control apparatus according to claim 5 further comprising:

the valve arrangement being operable in a controlled state in which auxiliary circuit is fluidly connected to the two hydraulic connectors such that the flow of fluid in the auxiliary circuit of the trailing vehicle is dependent upon the state of the accessory circuit of the utility vehicle;

the controller including a controlled mode of operation in which the valve arrangement remains in the controlled state regardless of an operating condition of the utility vehicle; and the apparatus further comprising an operator interface arranged to be supported in an operator cab of the utility vehicle and arranged to switch the mode of controller between the automatic mode and the controlled mode in response to operator input.

10. The control apparatus according to claim 1 wherein said at least one wheel actuator comprises a plurality of wheel actuators in which each wheel actuator is operatively connected to a respective one of the self steering wheels of the trailing vehicle, each wheel actuator comprising a cylinder supporting the two fluid ports thereon and a piston received within the cylinder so as to be linearly slidable between the two fluid ports.

11. The control apparatus according to claim 10 wherein said at least one wheel actuator comprises two wheel actuators associated with two of the self steering wheels of the trailing vehicle respectively.

12. The control apparatus according to claim 1 wherein said at least one wheel actuator comprises four wheel actuators associated with four of the self steering wheels of the trailing vehicle respectively.

13. A trailing vehicle arranged to be connected in towed relation to a utility vehicle, the utility vehicle including a hydraulic system having at least one accessory circuit comprised of two connecting lines and a utility switch on the utility vehicle operatively connected between the first and second connecting lines in which the utility switch is operable in at least one first active state in which the hydraulic system actively pumps fluid into a first connecting line of the two connecting lines and receives fluid through a second connecting line of the two connecting lines and in at least one second state different from the first active state, the trailing vehicle comprising:

at least two self steering wheels that are arranged to self steer in response to rolling ground contact;

at least one wheel actuator operatively connected to the self steering wheels, the at least one wheel actuator comprising a hydraulic actuator have a pair of opposing fluid ports;

an auxiliary circuit supported on the trailing vehicle, the auxiliary circuit forming a continuous loop receiving said at least one wheel actuator connected in series with the continuous loop;

two hydraulic connectors arranged to be connected to the two connecting lines of the accessory circuit of the towing vehicle; and a valve arrangement operatively connecting the two hydraulic connectors to the continuous loop of the auxiliary circuit;

the valve arrangement being operable in a locked state in which the continuous loop is isolated from the two hydraulic connectors and in which the continuous loop is interrupted to prevent a flow of fluid in the continuous loop regardless of the state of the accessory circuit of the utility vehicle; and the valve arrangement being operable in an unlocked state in which the continuous loop is isolated from the two hydraulic connectors and in which the continuous loop is uninterrupted to allow the flow of fluid in the continuous loop regardless of the state of the accessory circuit of the utility vehicle.

14. The trailing vehicle according to claim 13 wherein the valve arrangement includes a control valve connected in series with the continuous loop of the auxiliary circuit, the control valve being operable between a closed position interrupting the continuous loop in the locked state of the valve arrangement and an open position allowing fluid flow in the continuous loop in the unlocked state of the valve arrangement.

15. The trailing vehicle according to claim 13 further comprising:
the valve arrangement being operable in a controlled state in which auxiliary circuit is fluidly connected to the two hydraulic connectors such that the flow of fluid in the auxiliary circuit of the trailing vehicle is dependent upon the state of the accessory circuit of the utility vehicle; and
the valve arrangement including two isolation valves, each isolation valve being arranged to connect one of the connecting lines of the accessory circuit of the utility vehicle to the continuous loop of the auxiliary circuit on the trailing vehicle, the isolation valves being operable between (i) a closed position in which the auxiliary circuit is isolated from the accessory circuit in the locked state and in the unlocked state of the valve arrangement and (ii) an open position in which the auxiliary circuit of the trailing vehicle communicates with the accessory circuit of the utility vehicle in the controlled state of the valve arrangement.

16. The trailing vehicle according to claim 15 wherein the valve arrangement includes a control valve connected in series with the continuous loop of the auxiliary circuit, the control valve being operable between a closed position interrupting the continuous loop in the locked state of the valve arrangement and an open position allowing fluid flow in the continuous loop in the unlocked state of the valve arrangement, the control valve being situated in the continuous loop directly between junctions of the isolation valves with the continuous loop.

17. The trailing vehicle according to claim 13 further comprising one or more condition sensors arranged to sense one or more prescribed operating conditions of the trailing vehicle, and a controller operatively connected to the valve arrangement, the controller being operable in an automatic mode in which the controller is arranged to change the valve arrangement from the unlocked state to the locked state responsive to the one or more prescribed operating conditions sensed by the one or more condition sensors meeting one or more locking criterium stored on the controller.

18. The trailing vehicle according to claim 17 wherein the one or more condition sensors include a speed sensor arranged to sense an operating speed of the trailing vehicle and wherein the one or more locking criterium includes a speed limit, whereby the controller is arranged to change the valve arrangement from the unlocked state to the locked state responsive to the operating speed sensed by the speed sensor exceeding the speed limit stored on the controller.

19. The trailing vehicle according to claim 17 wherein the one or more condition sensors include a directional sensor arranged to sense an operating direction of the trailing vehicle and wherein the one or more locking criterium includes a reverse direction of operation of the trailing vehicle, whereby the controller is arranged to change the valve arrangement from the unlocked state to the locked state responsive to the operating direction sensed by the directional sensor corresponding to the reverse direction.

20. The trailing vehicle according to claim 17 further comprising:
the valve arrangement being operable in a controlled state in which auxiliary circuit is fluidly connected to the two hydraulic connectors such that the flow of fluid in the auxiliary circuit of the trailing vehicle is dependent upon the state of the accessory circuit of the utility vehicle;
the controller including a controlled mode of operation in which the valve arrangement remains in the controlled state regardless of an operating condition of the utility vehicle; and
the controller including a locked mode of operation in which the valve arrangement remains in the locked state regardless of an operating condition of the utility vehicle; and
an operator interface arranged to be supported in an operator cab of the utility vehicle and arranged to switch the mode of controller between the automatic mode, the controller mode, and the locked mode in response to operator input.

* * * * *